United States Patent
Bloch

(10) Patent No.: US 6,820,261 B1
(45) Date of Patent: Nov. 16, 2004

(54) INHERITABLE THREAD-LOCAL STORAGE

(75) Inventor: Joshua J. Bloch, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/353,535

(22) Filed: Jul. 14, 1999

(51) Int. Cl.[7] .............................. G06F 9/46; G06F 9/44
(52) U.S. Cl. ........................ 718/100; 717/114; 717/116
(58) Field of Search ........................ 718/1, 100, 102, 718/104, 108; 717/114, 116, 130; 709/1, 100, 102, 104, 108

(56) References Cited

U.S. PATENT DOCUMENTS

| | | | | |
|---|---|---|---|---|
| 5,893,912 A | * | 4/1999 | Freund et al. | 707/103 R |
| 5,913,059 A | * | 6/1999 | Torii | 709/104 |
| 6,026,428 A | * | 2/2000 | Hutchison et al. | 709/108 |
| 6,272,518 B1 | * | 8/2001 | Blazo et al. | 709/102 |
| 6,286,027 B1 | * | 9/2001 | Dwyer et al. | 718/107 |
| 6,292,820 B1 | * | 9/2001 | Korn | 709/100 |
| 6,370,684 B1 | * | 4/2002 | De Pauw et al. | 717/124 |
| 6,378,004 B1 | * | 4/2002 | Galloway et al. | 709/321 |
| 6,418,442 B1 | * | 7/2002 | Dwyer III | 707/100 |
| 6,553,531 B1 | * | 4/2003 | Kim et al. | 714/739 |
| 6,560,628 B1 | * | 5/2003 | Murata | 709/103 |
| 6,643,802 B1 | * | 11/2003 | Frost et al. | 714/37 |

OTHER PUBLICATIONS

Butenhof, "Thread Specific Data", Programming with Posix® Threads, Chapter 5, pp 161–172.
Petzold, "Thread Local Storage (TLS)", Programming Windows® 95, Section IV The Kernel and the Printer, pp 780–781.

* cited by examiner

*Primary Examiner*—Meng-Al T. An
*Assistant Examiner*—Syed Ali
(74) *Attorney, Agent, or Firm*—Beyer Thomas & Weaver LLP

(57) ABSTRACT

In a threading mechanism, a system and method for providing automatic value inheritance when a parent thread creates a child thread. Upon thread creation, the system iterates over all of the inheritable thread-local values associated with a parent thread and initializes a child's values of these inheritable thread-local values, based on an appropriate child value method. The child's values may be a copy of the parent's values, or a predetermined function of the parent's values.

24 Claims, 7 Drawing Sheets

| Constructor Summary |
|---|
| ThreadLocal ( )     Creates a ThreadLocal variable. |

| Method Summary | |
|---|---|
| Object | get( )    Returns the value in the calling thread's copy of this ThreadLocal variable |
| Protected Object | InitialValue( )    Returns the calling thread's initial value for this ThreadLocal variable. |
| void | set (Object value)    Sets the calling thread's instance of this ThreadLocal variable to the given value |
| Methods inherited from class java.lang.Object | |
| clone, equals, finalize, getClass, hashCode, notify, notifyAll, notifyAll, toString, wait, | |

Constructor Detail

ThreadLocal public ThreadLocal

Creates a ThreadLocal variable.

Method Detail initialValue protected Object initialvalue( )

Returns the calling thread's initial value for this ThreadLocal variable. This method will be called once per accessing thread for each ThreadLocal, the first time each thread accesses the variable with get or set. If the programmer desires ThreadLocal variables to be initialized to some value other than null, ThreadLocal must be subclassed, and this method overridden. Typically, an anonymous inner class will be used. Typical implementations of initial Value will call an appropriate constructor and return the newly constructed object.

get public Object get( )

Returns the value in the calling thread's copy of this ThreadLocal variable. Creates and initializes the copy of this is the first time the thread has called this method.

set public void set (Object value)

Sets the calling thread's instance of this ThreadLocal variable to the given value. This is only used to change the value from the one assigned by the initialValue method, and many applications will have no need for this functionality.
    Parameters
           value - the value to be stored in the calling threads' copy of this ThreadLocal.

*FIG. 3 (PRIOR ART)*

| Constructor Summary |
|---|
| InheritableThreadLocal( ) <br>    Creates an Inheritable ThreadLocal variable. |

| Method Summary | |
|---|---|
| Protected Object | childValue( Object parentValue) <br>    Computes the child's initial value for this Inheritable ThreadLocal as a function of the parent's value at the time the child Thread is created. |

| Methods inherited from class java.lang.ThreadLocal |
|---|
| get, initialValue, set |

| Methods inherited from class java.lang.Object |
|---|
| clone, equals, finalize, getClass, hashCode, notify, notifyAll, toString, wait |

Constructor Detail

InheritableThreadLocal public InheritableThreadLocal( )

Creates an InheritableThreadLocal variable.

Method Detail childValue protected Object childValue ( Object parentValue )

Computes the child's initial value for this InheritableThreadLocal as a function of the parent's value at the time the child Thread is created. This method is called from within the parent thread before the child is started.

This method merely returns its input argument, and should be overridden if a different behavior is desired.

*FIG. 4*

INHERITABLE THREAD-LOCAL STORAGE

BACKGROUND OF THE INVENTION

1. Field of the Invention

The present invention relates generally to the field of computer software, and more particularly to inheritable thread-local storage.

2. Description of the Related Art

Modern multitasking operating systems support multiple threads, which allow many activities to execute simultaneously. For example, searches on multiple remote databases may all be launched by one task, each search corresponding to a unique thread, and executed simultaneously. Oftentimes, it is convenient to have storage that is unique to each thread. Unfortunately, most programming languages do not support such storage. However, there is a standard software mechanism for threads to associate implicit scope information with themselves, known variously as "thread-local data" or "thread-specific data." This facility exists in many threading facilities, including POSIX Threads ("Pthreads") and Win32 Threads.

Under POSIX, thread-specific data allows each thread to have a separate copy of a variable, which is indexed by a common "key" value. A key is created and each thread independently sets or gets its own unique value for that key. The key is the same for all the threads, but each thread can associate its own unique value with the shared key. Each thread can change its private value for a key without affecting the key or any other thread's value for the key. When the threading system is asked for a new key, a new variable is created. This type of "key" system is not secure, however, since the keys can be forged and data accessed without permission. The POSIX thread-specific data mechanism is explained in further detail in *Programming in POSIX Threads*, David R. Butenhof, Addison-Wesley, 1997, herein incorporated by reference. A similar mechanism is available in the Windows 95 operating system, and is discussed in *Programming Windows 95*, Charles Petzold, Microsoft Press, 1996, herein incorporated by reference.

The Java™ programming language, created by Sun Microsystems, is somewhat unique among programming languages in that it has built-in thread-local storage support. Specifically, there is a public class "ThreadLocal" that provides thread-local variables. The thread-local variables differ from the other "normal" Java variables in that each thread that accesses a thread-local variable (via a get or set method) has its own, independently initialized copy of the variable. ThreadLocal objects are typically private static variables in classes that want to associate a state with a thread, such as a user ID or a transaction ID. Each thread holds an implicit reference to its copy of a ThreadLocal as long as the thread is in existence and is accessible. After a thread terminates, all of its copies of ThreadLocal variables are subject to garbage collection, unless other references to these copies exist. FIG. 3 is a table illustrating the API specification for the class ThreadLocal.

For many programming applications, is often desirable for threads to carry with them some implicit "scope" information, such as the principal or transaction on whose behalf the thread is executing. When a thread ("the parent") creates another thread ("the child"), it is often desirable that this scope information be automatically transmitted from parent to child, in a manner that may depend on the details of the scope information in question. The thread-specific data (hereinafter "thread-local data" or "thread-local storage") mechanisms described above do not solve this problem, however, since values are not passed from parent threads to child threads.

In view of the foregoing, it would be desirable to have a thread-local storage mechanism in which a child thread can inherit its parent's values directly, or in which a child thread could inherit values which are some functions of the parent's values.

SUMMARY OF THE INVENTION

In a threading mechanism, the present invention is a system and method for providing automatic value inheritance when a parent thread creates a child thread. Upon the creation of a child thread, the system iterates over all of the inheritable thread-local values associated with the parent thread and initializes the child's values of these inheritable thread-local values, based on an appropriate childValue method.

In a first embodiment, for each thread, a hash table maps each thread local object to a value. In a preferred implementation, the hash table is two separate logical maps—one for inheritable values and one for non-inheritable values. When a thread creates a child, the system iterates over the inheritable value map to create the child's values. An inheritance protocol (i.e. the "childValue" method) may be performed on the values in order to calculate the child's value as a function of the parent's value, if desired.

In an alternative embodiment, the two hash tables in the first embodiment can be combined into one table, with each entry having a flag to identify the inheritable values.

In a second embodiment of the present invention, for each thread-local variable, a hash table maps each thread to a value. An object reference to a current thread is used as a look-up key in the hash table to find the value associated with this thread. For each thread, a linked list called "values" links all the inheritable thread-local values associated with the thread. The head pointer to the linked list of inheritable values is stored in the thread object. When a parent thread creates a child thread, the system iterates over the linked list of thread-local values pertaining to the parent thread. For each parent value, a "childValue" method is invoked to initialize the associated child's value.

In a preferred embodiment, the present invention is implemented in the Java™ programming language. The InheritableThreadLocal class of the present invention extends the ThreadLocal class to provide inheritance of values from a parent thread to a child thread. When a child thread is created, the child receives initial values for all InheritableThreadLocals for which the parent has values. Normally, the child's values will be identical to the parent's values. However, the child's value can be made to be an arbitrary function of the parent's value by overriding the "childValue" method in the InheritableThreadLocal class.

BRIEF DESCRIPTION OF THE DRAWINGS

The present invention will be readily understood by the following detailed description in conjunction with the accompanying drawings, wherein like reference numerals designate like structural elements, and in which:

FIG. 3 is table of a prior art ThreadLocal API specification;

FIG. 4 is a table of the InheritableThreadLocal API specification of the present invention;

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide an inheritable thread-local storage mechanism.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 1:
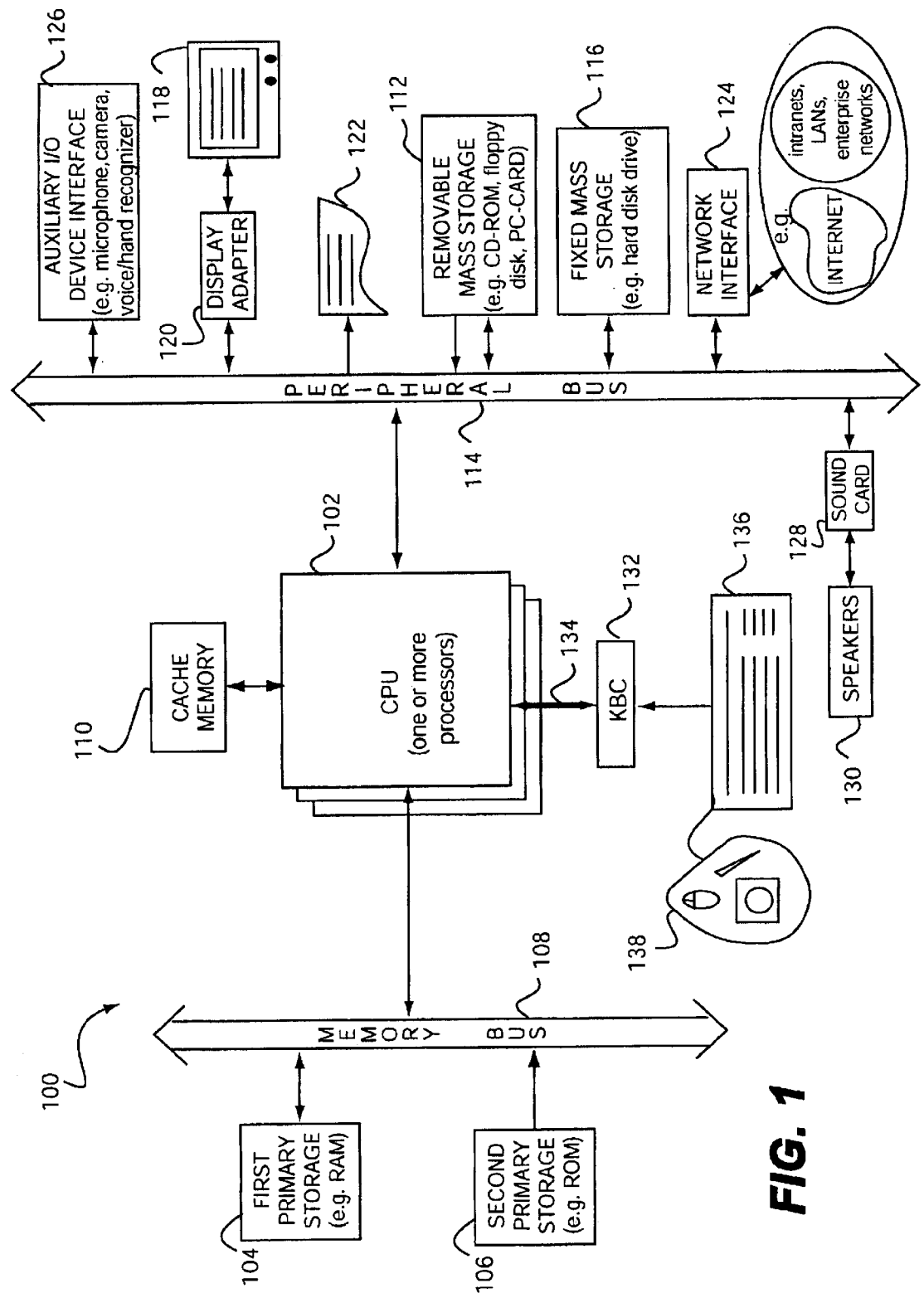
FIG. 1 is a block diagram of a computer system suitable for implementing the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. It should be noted that in re-configurable computing systems, CPU 102 can be distributed amongst a group of programmable logic devices. In such a system, the programmable logic devices can be reconfigured as needed to control the operation of computer system 100. In this way, the manipulation of input data is distributed amongst the group of programmable logic devices. CPU 102 is a general purpose digital processor which controls the operation of the computer system 100. Using instructions retrieved from memory, the CPU 102 controls the reception and manipulation of input data, and the output and display of data on output devices.

CPU 102 is coupled bi-directionally with a first primary storage 104, typically a random access memory (RAM), and uni-directionally with a second primary storage area 106, typically a read-only memory (ROM), via a memory bus 108. As is well known in the art, primary storage 104 can be used as a general storage area and as scratch-pad memory, and can also be used to store input data and processed data. It can also store programming instructions and data, in the form of data objects, in addition to other data and instructions for processes operating on CPU 102, and is used typically used for fast transfer of data and instructions in a bi-directional manner over the memory bus 108. Also as well known in the art, primary storage 106 typically includes basic operating instructions, program code, data and objects used by the CPU 102 to perform its functions. Primary storage devices 104 and 106 may include any suitable computer-readable storage media, described below, depending on whether, for example, data access needs to be bi-directional or uni-directional. CPU 102 can also directly and very rapidly retrieve and store frequently needed data in a cache memory 110.

A removable mass storage device 112 provides additional data storage capacity for the computer system 100, and is coupled either bi-directionally or uni-directionally to CPU 102 via a peripheral bus 114. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 116 also provides additional data storage capacity and is coupled bi-directionally to CPU 102 via peripheral bus 114. The most common example of mass storage 116 is a hard disk drive. Generally, access to these media is slower than access to primary storages 104 and 106.

Mass storage 112 and 116 generally store additional programming instructions, data, and the like that typically are not in active use by the CPU 102. It will be appreciated that the information retained within mass storage 112 and 116 may be incorporated, if needed, in standard fashion as part of primary storage 104 (e.g. RAM) as virtual memory.

In addition to providing CPU 102 access to storage subsystems, the peripheral bus 114 is used to provide access other subsystems and devices as well. In the described embodiment, these include a display monitor 118 and adapter 120, a printer device 122, a network interface 124, an auxiliary input/output device interface 126, a sound card 128 and speakers 130, and other subsystems as needed.

The network interface 124 allows CPU 102 to be coupled to another computer, computer network, or telecommunications network using a network connection as shown. Through the network interface 124, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 124.

Auxiliary I/O device interface 126 represents general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 102 is a keyboard controller 132 via a local bus 134 for receiving input from a keyboard 136 or a pointer device 138, and sending decoded symbols from the keyboard 136 or pointer device 138 to the CPU 102. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 108, peripheral bus 114, and local bus 134 are illustrative of any interconnection scheme serving to link the subsystems. For example, a local bus could be used to connect the CPU to fixed mass storage 116 and display adapter 120. The computer system shown in FIG. 1 is but an example of a computer system suitable for use with the invention. Other computer architectures having different configurations of subsystems may also be utilized.

Figure 2:
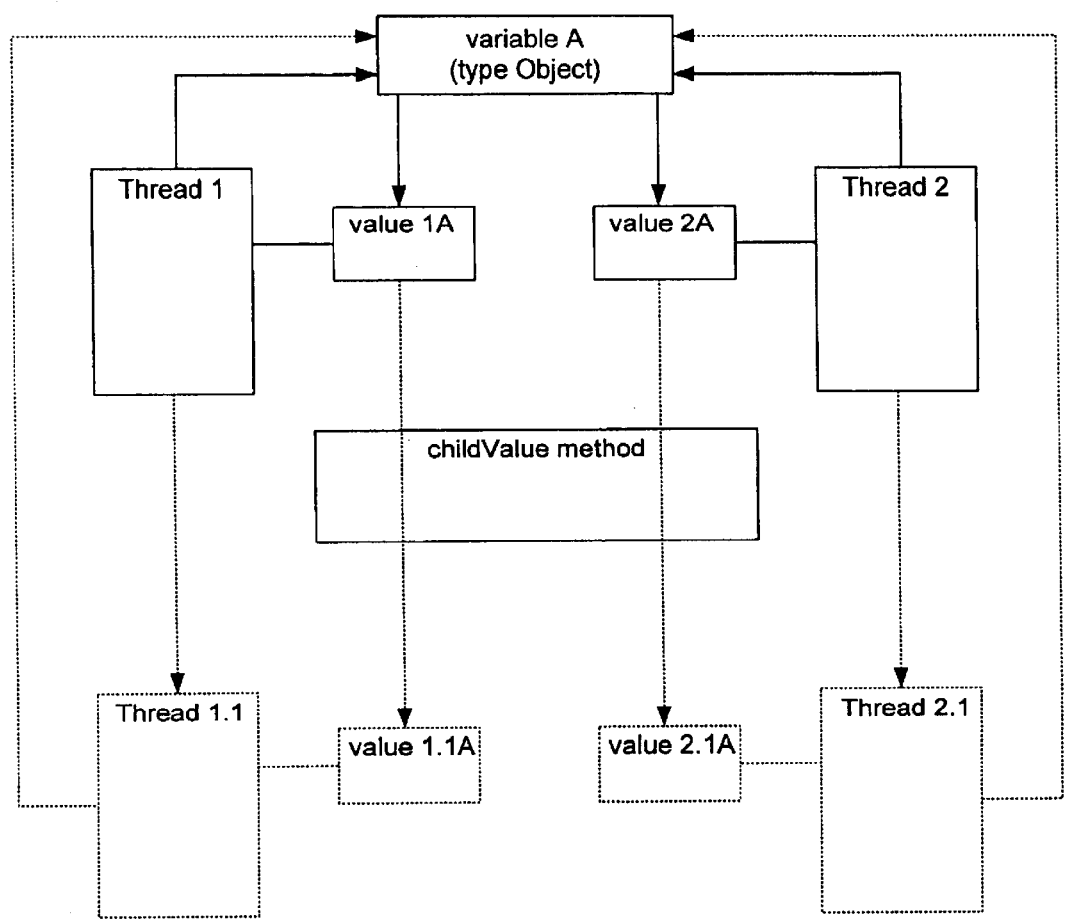
FIG. 2 is a block diagram illustrating value inheritance for a child thread.

In general, the inheritable thread-local storage of the present invention is similar to ordinary thread-local storage, available in most modern threading facilities (such as POSIX Threads or Win32 Threads). However, the inheritable thread-local storage values of the present invention are automatically passed from a parent thread to a child thread ("inherited") when a child thread is created, as shown in FIG. 2. In FIG. 2, Thread 1 creates a new child, Thread 1.1. Thread 1's value 1A is passed via the childValue method to the child Thread 1.1 as value 1.1A. Similarly, all other inheritable values associated with Thread 1 are transferred to Thread 1.1. Thus, the child Thread 1.1 receives initial values for all inheritable thread-local variables for which the parent Thread 1 has values. Similarly, Thread 2 creates a new child, Thread 2.2, having an inherited value 2.1A.

The present invention is a general-purpose facility that overcomes the inheritance limitations of the prior art systems. Although the present invention is described with reference to a preferred embodiment in the Java programming language, the teachings of the present invention are applicable to any implementation supporting thread-local storage. The teachings or the present invention are particularly applicable to other programming languages that support threads.

In the presently preferred embodiment, the present invention is implemented in the Java programming language. By using Java, the present invention is able to take advantage of the data security inherent in the language. The present implementation does not use "keys," but instead uses actual Java object references. An InheritableThreadLocal class API specification of the present invention is illustrated in the table of FIG. 4. When an object of type ThreadLocal or InheritableThreadLocal is created, only someone with access to the object is allowed to read the variables, thus providing improved data security, as compared to the "key" based systems.

The InheritableThreadLocal class of the present invention extends ThreadLocal to provide inheritance of values from a parent thread to a child thread. When a child thread is created, the child receives initial values for all InheritableThreadLocals for which the parent has values. Normally, the child's values will be identical to the parent's values. However, the child's value can be made to be an arbitrary function of the parent's value by overriding the "childValue" method in the InheritableThreadLocal class.

In general, the present invention may be implemented by either mapping, for each thread-local variable, each thread to a value, or for each thread, mapping each thread-local variable to a value. Both embodiments are discussed in detail below.

Figure 5:
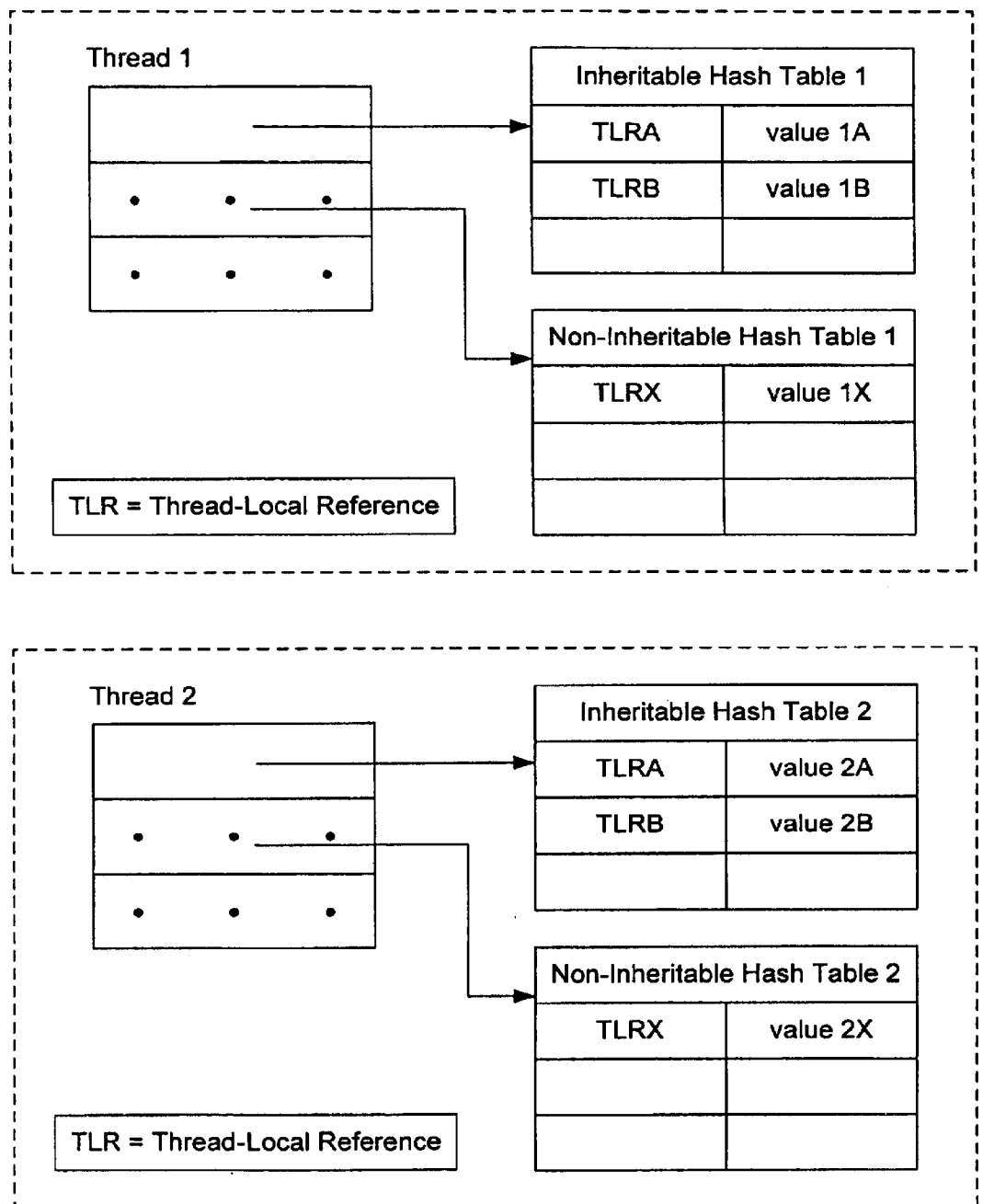
FIG. 5 is a diagram illustrating a first embodiment of the present invention.

In a first embodiment, for each thread, a hash table maps each thread-local variable to a value, as shown in FIG. 5. More particularly, under Java, each thread-local variable is represented by a thread-local reference in the hash table and the thread-local reference is mapped to a particular value. In a preferred implementation, separate hash tables are maintained for each logical map—one for inheritable values and one for non-inheritable values. When a thread creates a child, the system iterates over the inheritable value map to create the child's values. An inheritance protocol can then be performed on the values in order to calculate the child's value as a function of the parent's value, if necessary. This implementation requires only one data structure, since no linked list is necessary. Also, since the map is only accessed by the one thread associated with the values, no synchronization is required. In a second embodiment, described below, the maps are shared so a synchronization scheme must be implemented to ensure that the values are not inadvertently overwritten by another thread.

Figure 6:
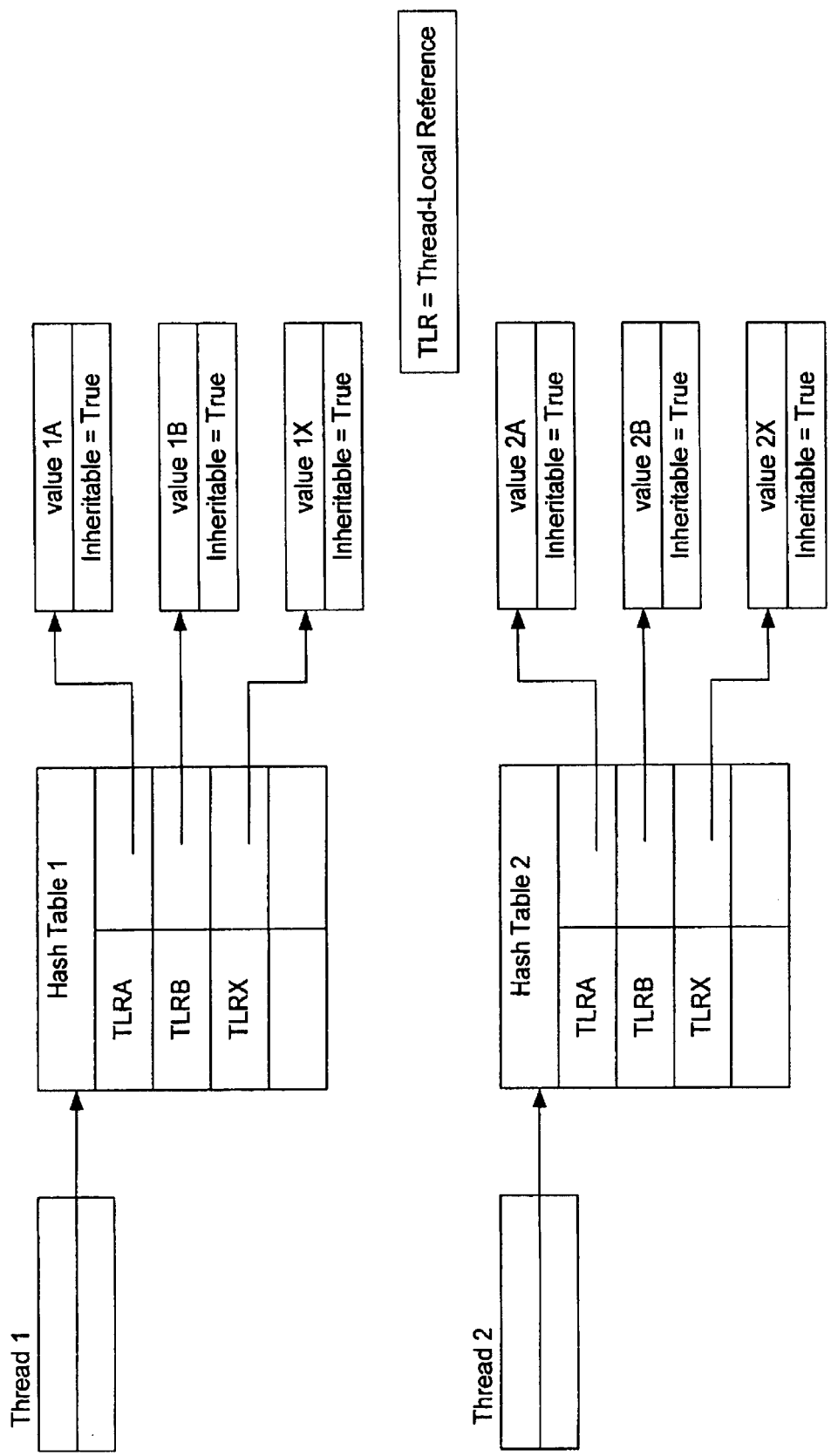
FIG. 6 is a diagram of an alternative implementation of the first embodiment of the present invention.

In an alternative embodiment, the two hash tables in the first embodiment can be combined as shown in FIG. 6, with each entry having a logical flag to identify the inheritable values. As in the first embodiment, when a thread creates a child, the system iterates over the inheritable value to create the child's values.

When a parent thread creates a child thread, the system iterates over the inheritable thread-local values pertaining to the parent thread. For each parent value, a "childValue" method is invoked to initialize the associated child's value. The default childValue method may be overridden to compute a desired value as a function of the parent value. If the childValue method has not been overridden, then by default, the value is just a copy of the parent's value. Thus, a child thread "inherits" the values (or some function of the values) of the parent thread.

Figure 7:
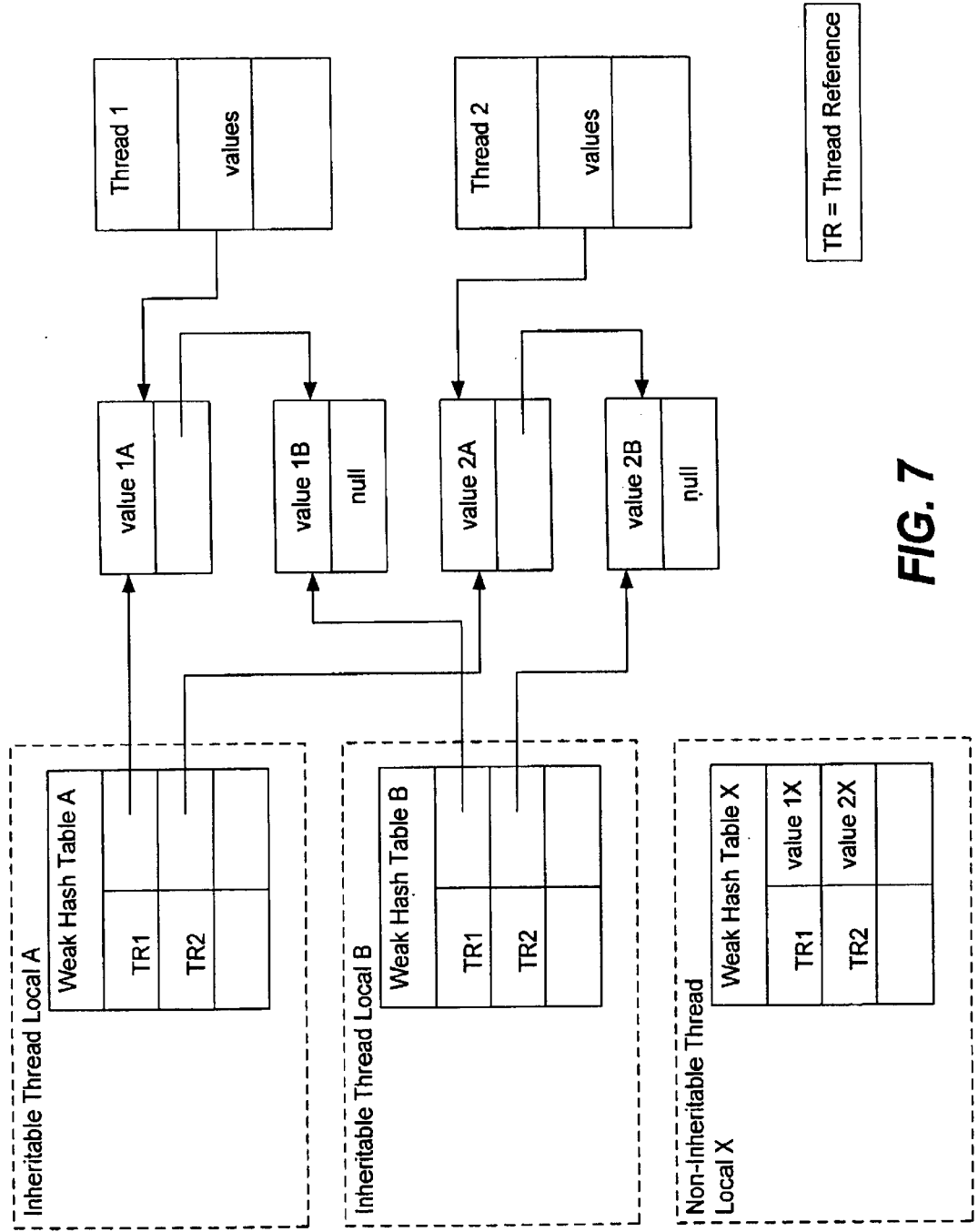
FIG. 7 is a diagram illustrating a second embodiment of the present invention.

In a second embodiment of the present invention, for each thread-local variable, a hash table maps each thread to a value, as illustrated in FIG. 7. An object reference to a current thread is used as a look-up key in the hash table to find the value associated with this thread. For each thread, a linked list called "values" links all the inheritable thread-local values associated with the thread. The head pointer to the linked list of inheritable values is stored in the thread object. Note that for the non-inheritable values, a linked list is not necessary since the child thread will not inherit these values.

When a parent thread creates a child thread, the system iterates over the linked list of thread-local values pertaining to the parent thread. For each parent value, a "childvalue" method is invoked to initialize the associated child's value. The default childValue method may be overridden to compute a desired value as a function of the parent value. If the childValue method has not been overridden, then by default, the value is just a copy of the parent's value. Thus, a child thread "inherits" the values (or some function of the values) of the parent thread.

Further, in the second embodiment the hash table should contain only "weak references" to the threads, to allow the threads (and their thread-local values) to be garbage collected when they terminate. In a preferred implementation, the hash tables are implemented as "WeakHashMap" objects in Java.

Inheritable thread-local storage is used in preference to ordinary thread-local storage when the per-thread-attribute being maintained in the storage must be automatically transmitted to any child threads that are created. Common uses include such attributes as the user ID or transaction ID on whose behalf a computation is taking place. Storing such an attribute in inheritable thread-local storage automatically turns child threads into "natural extensions" of their parent, operating on behalf of the same entity.

The more general from of inheritable thread-local storage (where the child's initial value is an arbitrary function of the parent's) enables attributes where the child's initial value for the attribute is not identical to the parent's, but is derivable from it. For example, consider a dynamically scoped attribute, such as a transaction ID in a system that supports nested transactions. For such an attribute, each thread maintains in inheritable thread-local storage a "stack" of values representing the nested scopes currently in effect. The child's initial value for such a thread-local variable should be a stack with one element, that is, the top of the parent's stack.

Thus, according to the present invention, upon thread creation, the system iterates over all of the inheritable thread-local values associated with a parent thread and initializes the child's values of these inheritable thread-local values based on the appropriate child value methods. The present invention is thereby able to provide automatic value inheritance upon child creation.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for providing inheritable thread-local storage from a parent thread to a child thread, the method comprising:

for each thread-local variable, mapping each thread-local variable to a value;

when a parent thread creates a child thread, automatically iterating over the parent thread's values to create the child thread's initial values;

wherein the step of mapping comprises maintaining a map, associated with each thread object, that maps each thread-local variable to a value and wherein the step of iterating comprises iterating over the map;

wherein the map comprises a hash table;

wherein the step of mapping further comprises creating a separate hash table for inheritable values and a separate hash table for non-inheritable values.

2. The method of claim 1, wherein a child thread's initial value of a thread-local variable is a copy of a corresponding parent thread's value of a thread-local variable.

3. The method of claim 1, wherein a child thread's value of a thread-local variable is a predetermined function of a corresponding parent thread's value of a thread-local variable.

4. The method of claim 1, wherein the method is implemented in a Java programming language as a class.

5. The method as recited in claim 1, wherein the method is performed in a single processor system.

6. A method for providing inheritable thread-local storage from a parent thread to a child thread, the method comprising:

for each thread-local variable, mapping each thread-local variable to a value; and when a parent thread creates a child thread, automatically iterating over the parent thread's values to create the child thread's initial values;

wherein the step of mapping comprises maintaining a map, associated with each thread-local variable, that maps each thread to a value, and wherein for each thread a linked list is maintained, the linked list linking inheritable thread-local values associated with the thread; and wherein the step of iterating comprises iterating over the linked list;

wherein the map comprises a hash table;

wherein the step of mapping further comprises creating a hash table having both inheritable values and non-inheritable values, wherein each value has a flag to identify whether each value in the table is an inheritable or non-inheritable value.

7. The method of claim 6, wherein the method is implemented in a Java programming language as a class.

8. The method as recited in claim 6, wherein the method is performed in a single processor system.

9. A method for providing automatic value inheritance when a parent thread creates a child thread, the method comprising:

associating, for each thread object, each thread-local variable with a value; and automatically iterating over the thread-local values to create a child value corresponding to each inheritable parent value, when a child is created;

wherein the step of associating comprises creating a separate hash table for inheritable values and a separate hash table for non-inheritable values.

10. The method of claim 9, wherein the child value is a copy of the corresponding parent value.

11. The method of claim 9, wherein the child value is a function of the corresponding parent value.

12. The method of claim 9, wherein the method is implemented in a Java programming language as a class.

13. A method for providing automatic value inheritance when a parent thread creates a child thread, the method comprising:

associating, for each thread object, each thread-local variable with a value; and automatically iterating over the thread-local values to create a child value corresponding to each inheritable parent value, when a child is created;

wherein the step of associating comprises creating a hash table having both inheritable values and non-inheritable values, wherein each value has a flag to identify whether each value in the table is an inheritable or non-inheritable value.

14. The method of claim 13, wherein the child value is a copy of the corresponding parent value.

15. The method of claim 13, wherein the child value is a function of the corresponding parent value.

16. The method of claim 13, wherein the method is implemented in a Java programming language as a class.

17. A computer readable medium including computer program code for providing automatic value inheritance when a parent thread creates a child thread, the parent thread having at least one thread-local object value, the computer readable medium comprising:

computer program code for associating, for each thread object, each thread-local variable with a value; and computer program code for automatically iterating over the thread-local values to create a child value corresponding to each inheritable parent value, when a child is created;

wherein the computer code for associating comprises code for creating a separate hash table for inheritable values and a separate hash table for non-inheritable values.

18. The medium of claim 17, wherein the child value is a copy of the corresponding parent value.

19. The medium of claim 17, wherein the child value is a function of the corresponding parent value.

20. The medium of claim 17, wherein the computer program code is implemented in a Java programming language as a class.

21. A computer readable medium including computer program code for providing automatic value inheritance when a parent thread creates a child thread, the parent thread having at least one thread-local object value, the computer readable medium comprising:

computer program code for associating, for each thread object, each thread-local variable with a value; and computer program code for automatically iterating over the thread-local values to create a child value corresponding to each inheritable parent value, when a child is created;

wherein the computer code for associating comprises computer code for creating a hash table having both inheritable values and non-inheritable values, wherein each value has a flag to identify whether each value in the table is an inheritable or non-inheritable value.

22. The medium of claim 21, wherein the child value is a copy of the corresponding parent value.

23. The medium of claim 21, wherein the child value is a function of the corresponding parent value.

24. The medium of claim 21, wherein the computer program code is implemented in a Java programming language as a class.

* * * * *